United States Patent [19]
Gaudet et al.

[11] 3,926,806
[45] Dec. 16, 1975

[54] NO-BYPASS FILTER SYSTEM

[75] Inventors: Ronald M. Gaudet, Cheshire, Conn.;
Samuel S. Michell, Monroeville;
Michael J. Kozy, Pittsburgh, both of Pa.

[73] Assignee: Schroeder Brothers Corporation, McKees Rocks, Pa.

[22] Filed: June 10, 1974

[21] Appl. No.: 477,982

[52] U.S. Cl. ............................................. 210/137
[51] Int. Cl.² ......................................... B01D 33/40
[58] Field of Search ............ 210/137, 136, 130, 133

[56] References Cited
UNITED STATES PATENTS

| | | | |
|---|---|---|---|
| 1,780,723 | 11/1930 | Short | 210/137 |
| 3,289,841 | 12/1966 | Quinting | 210/136 X |

*Primary Examiner*—Frank A. Spear, Jr.
*Attorney, Agent, or Firm*—Webb, Burden, Robinson & Webb

[57] ABSTRACT

A no by-pass filter system comprising a filter head, canister and filter element arranged to divide the canister into an upstream and a downstream side. Ports in the filter head direct fluid to and away from the filter element. Positioned in the flow path between the filter element and the outlet port is a device responsive to the differential pressure across the filter element for restricting flow and thereby maintaining the differential pressure substantially constant.

4 Claims, 4 Drawing Figures

NO-BYPASS FILTER SYSTEM

BACKGROUND

Hydraulic systems which comprise reservoirs, pumps and work elements such as servo valves, hydraulic cylinders or motors must contain suitable filters to maintain the contamination at safe levels. The source of the contamination may include for example, solid particles from chemical breakdown of the fluid medium itself, contaminants created by pump cylinder and valve port wear and erosion, contaminants present when the hydraulic system is first started up and those introduced during installation of new or additional elements to the system or adding additional fluid to the system.

Hydraulic filters are generally comprised of a filter head or base to which is secured a canister or bonnet. A filter element, generally tubular, is positioned within the bonnet. The filter head is shaped to be connected to the inlet and outlet conduit. The filter head directs flow through the filter element.

As the filter element gathers dirt, the pressure drop across the element rises. In a typical case, if the filter element is not replaced, the pressure rises to the threshold level of the pressure bypass valve which bypasses the fluid around the filter element. In some applications, for example, systems containing certain servo valves, it would be unsuitable to bypass the filter element for a period long enough for the fluid to reach a damaging contamination level. In these instances, because of the very high pressure drops which may develop, high crush filter elements are employed. These are extremely expensive relative to the throw away filter elements typically used in bypass systems.

It is an advantage of this invention to provide a no-bypass filter system which need not use high crush filter elements, but may use conventional throw away filter elements. It is a further advantage of this invention that the working elements of the no-bypass filter system are provided within the filter housing.

Briefly, according to this invention, the filter system is comprised of the conventional filter head, canister, and filter element. The filter element is arranged to divide the canister into an inlet and outlet side. The filter head has an inlet port for directing fluid to the inlet side of the canister and an outlet port for delivering fluid from the outlet side of the canister. The improvement herein comprises a device within the filter head for maintaining a pressure drop across the filter element constant. This device comprises a piston and hollow cylinder which moves therein. The piston and cylinder are both hollow cylinders each with one closed end and one open end. The piston is arranged to slide within the cylinder such that closed ends of each are biased away from each other. Inlet and outlet holes are provided in the piston and cylinder walls to allow flow through the piston and cylinder. The closed end of the piston cylinder is in communication with the inlet port of the filter head, that is, with the upstream pressure. As upstream pressure increases, due to increased pressure differential across the filter element, the piston is forced to move against the bias within the cylinder. The relative movement of the piston and cylinder restrict the flow through the piston and cylinder. Hence, as the filter collects contaminants the pressure at the inlet port increases and the pressure drop across the filter element starts to increase. But, the relative movement of the pistons and cylinder restricts the flow through the piston and cylinder thereby limiting the differential pressure.

Other objects and advantages of this invention will become clear from a reading of the detailed description made with reference to the drawings in which.

Figure 1:
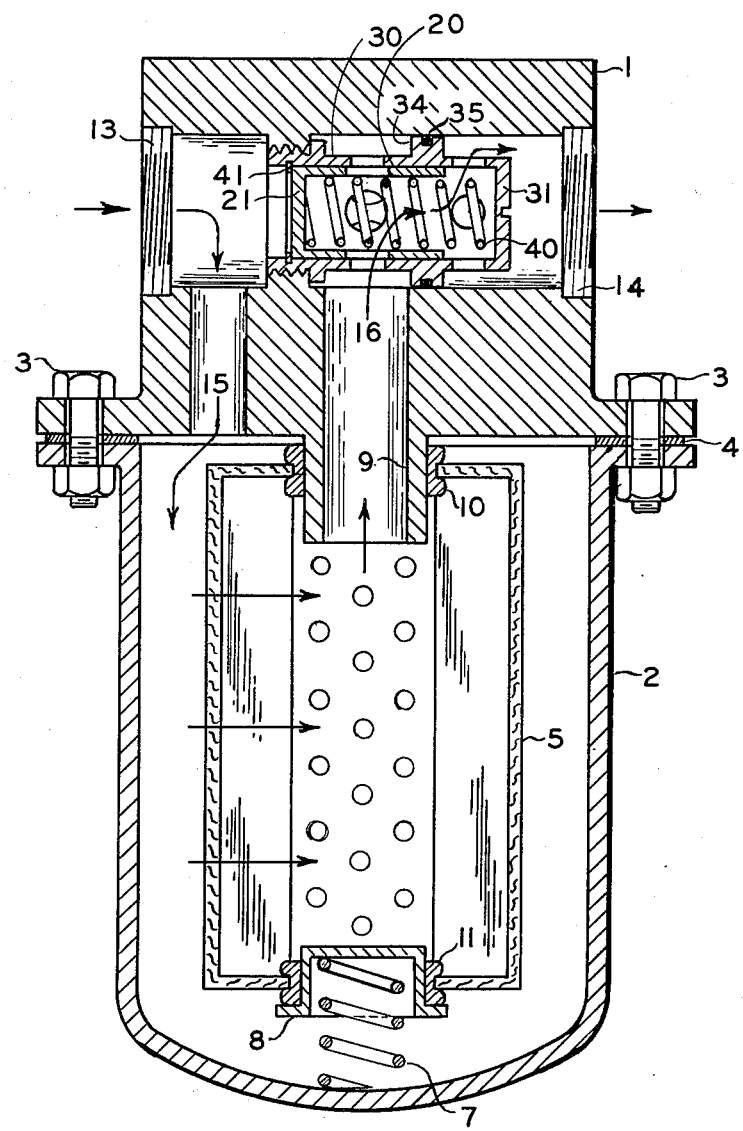
FIG. 1 is a section view of the filter system described herein.

Referring to FIG. 1, a filter system according to this invention comprises a filter head or block 1 and a canister 2 which are joined together by a suitable means such as bolts and nuts 3 through flanges provided therefor. Between the flanges, there is a gasket 4.

Within the canister is a filter element shown as a tubular filter element 5 of the type well known in the filtering art. The filter element is held in place by a spring 7 and end plate 8 at one end and a cylindrical extension 9 of the filter head 1. The filter element is provided with the sealing grommets 10 and 11 which prevent leakage past the filter element.

The filter head 1 has an inlet port 13 and outlet port 14. The filter head is provided with a passage 15 which directs flow from the inlet port 13 to the inlet side of the filter element. The filter head is provided with a passage 16 for directing flow away from the outlet side of the filter element through the outlet port 14.

Positioned between the passage 16 and the outlet port 14 is a device for limiting the pressure drop across the filter element. The device comprises a piston 20 and a piston cylinder 30. A spring 40 holds the closed end 21 of the piston 20 away from the fixed closed end 31 of the cylinder 30.

Figure 2:
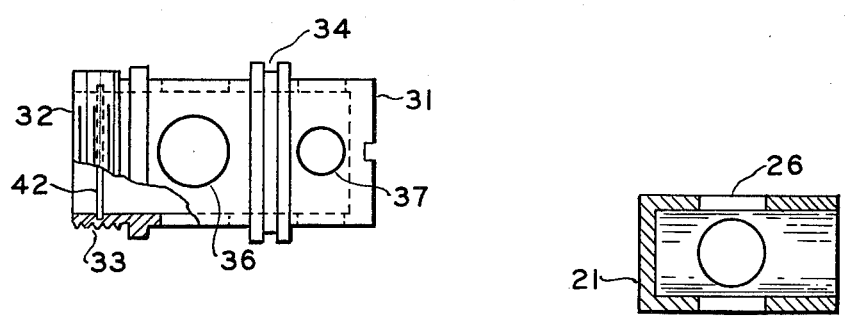
FIG. 2 is a view of a suitable cylinder for use according to this invention.

Referring now to FIG. 2, there is shown a suitable piston cylinder according to the teachings of this invention. The cylinder has an open end 32 and a closed end 31. The particular cylinder shown has threads 33 on the exterior near the open end. The cylinder can be inserted in the filter head 1 through the outlet port 14 and threaded into a position provided therefor. In that position, the open end of the cylinder is in communication with the inlet port. A pair of ribs 34 are spaced around the outer circumference of the cylinder for maintaining a seal, for example, O-ring 35 in position. The ribs are positioned about midway between the open and closed ends of the cylinder. Hence, when the cylinder is inserted in place in the filter head, fluid cannot flow from the outlet side of the filter element to the outlet port without passing through the cylinder. The cylinder is provided with a plurality of inlet openings 36 in the cylinder sidewall between the open end 32 and the ribs 34. The cylinder is provided with a plurality of outlet openings 37 positioned adjacent the closed end. These outlet openings cooperate with the skirt of the piston as explained hereafter, to restrict the flow to the outlet port.

Figure 3:
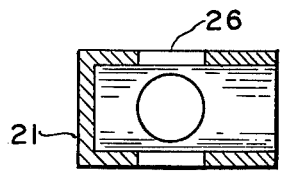
FIG. 3 is a section view of a suitable piston for use with the cylinder described in FIG. 2 and, FIG. 4 is a graph showing the change in differential pressure as the upstream pressure increases in filter systems according to this invention.

Referring to FIG. 3, the piston may be a simple hollow cylinder with a closed end 21. A plurality of inlet openings 26 are positioned about the cylindrical sidewall.

When the hollow piston is positioned within the cylinder, the closed end 21 of the piston 20 is biased away from the closed end 31 of the cylinder 30 by a spring 40. The spring may be held slightly compressed in its most expanded position by the piston held by a ring 41 snapped into a groove 42 on the inside of the cylinder near its open end. When the piston is biased against the ring 41 it is in its open position; that is, the openings 36 in the cylinder and the openings 26 in the piston are substantially aligned and the skirt of the piston does not overlap the outlet openings 37 of the cylinder. The piston is shorter than the cylinder to enable it not to obstruct the openings 37 when the piston is in the open position.

In operation, the no-bypass filter operates to maintain the difference between the upstream pressure P1 and the inner element pressure P2 substantially constant, or below the crushing strength of the filter element. The downstream pressure P3 also remains substantially constant. In a typical filter system the differential pressure across the filter element can increase almost indefinitely as the filter gathers contamination from the fluid system. In the no-bypass system, according to this invention, the differential pressure rises, the piston 20 moves within the cylinder 30 and thereby restricts the flow of fluid as the skirt of the piston moves over the outlet openings 37. The inner element pressure P2 increases with the upstream pressure P1 due to restriction. As the element continues to collect dirt the differential pressure increases to a critical point. That is, where the restriction caused by the piston skirt is such that P1 and P2 climb at a rapid rate until the system relief valve (not part of this invention) is opened. P1 and P2 always increase together, thus maintaining a substantially constant differential pressure. Meanwhile, the downstream pressure remains substantially constant with no increase except with workload variation.

When P1 reaches the relief valve setting and flow is diverted away from the filter, but not around the filter, the piston remains at the critical point until after the filter is changed. The system cannot be returned to normal until the element is serviced. Set forth below in Tables I and II are two test runs with the no-bypass filter according to this invention in which the upstream pressure P1, the inner element pressure P2 and the downstream pressure P3 were continuously monitored at various time increments and recorded at various time increments, as the filter element gathered contamination that had been intentionally placed in the system for the purpose of demonstrating the effectiveness of the no-bypass filter system.

TABLE I

| 5 GPM | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| P1 | 29 | 35 | 45 | 50 | 60 | 70 | 80 | 125 | 110 | 125 | 150 | 175 |
| P2 | 25 | 25 | 25 | 25 | 30 | 35 | 44 | 91 | 76 | 91 | 117 | 144 |
| P3 | 25 | 25 | 25 | 25 | 25 | 25 | 25 | 25 | 25 | 25 | 25 | 25 |
| ΔP1 & P2 | 4 | 10 | 20 | 25 | 30 | 35 | 35 | 34 | 33 | 33 | 32 | 31 |

In Table I, in a reasonably low pressure application, it can be seen that as contamination builds on the filter element, the upstream pressure P1 increases, however, the differential pressure remains relatively constant after reaching a critical point and the downstream pressure remains uniform.

TABLE II

| 5 GPM | 1 | 2 | 3 | 4 | 5 | 6 | 7 |
| --- | --- | --- | --- | --- | --- | --- | --- |
| P1 | 504 | 530 | 531 | 534 | 550 | 650 | 1000 |
| P2 | 500 | 500 | 500 | 500 | 515 | 615 | 975 |
| P3 | 500 | 500 | 500 | 500 | 500 | 500 | 200 |
| ΔP1 & P2 | 4 | 30 | 31 | 34 | 35 | 35 | 25 |

Referring now to Table II, a higher pressure application is demonstrated. Again, it will be seen that as the filter gathers contaminants, the upstream pressure increases and the differential pressure across the filter element remains relatively constant. In this application, the upstream pressure climbed to the system relief valve setting which was 1000 psi. At this point, the valve does not return to the open position even though the differential pressure drops off when the flow is diverted away from the no-bypass system. Flow must be completely cut off and the pressure relieved before the valve returns to the open position. This, of course, is highly desirable as it prevents the continued use of the system with a dirty filter. In the case of cold starts, the system may have to be warmed up by intentionally diverting flow away from the no-bypass filter until the fluid temperature and viscosity are suitable to prevent the closing of the valve.

Figure 4:
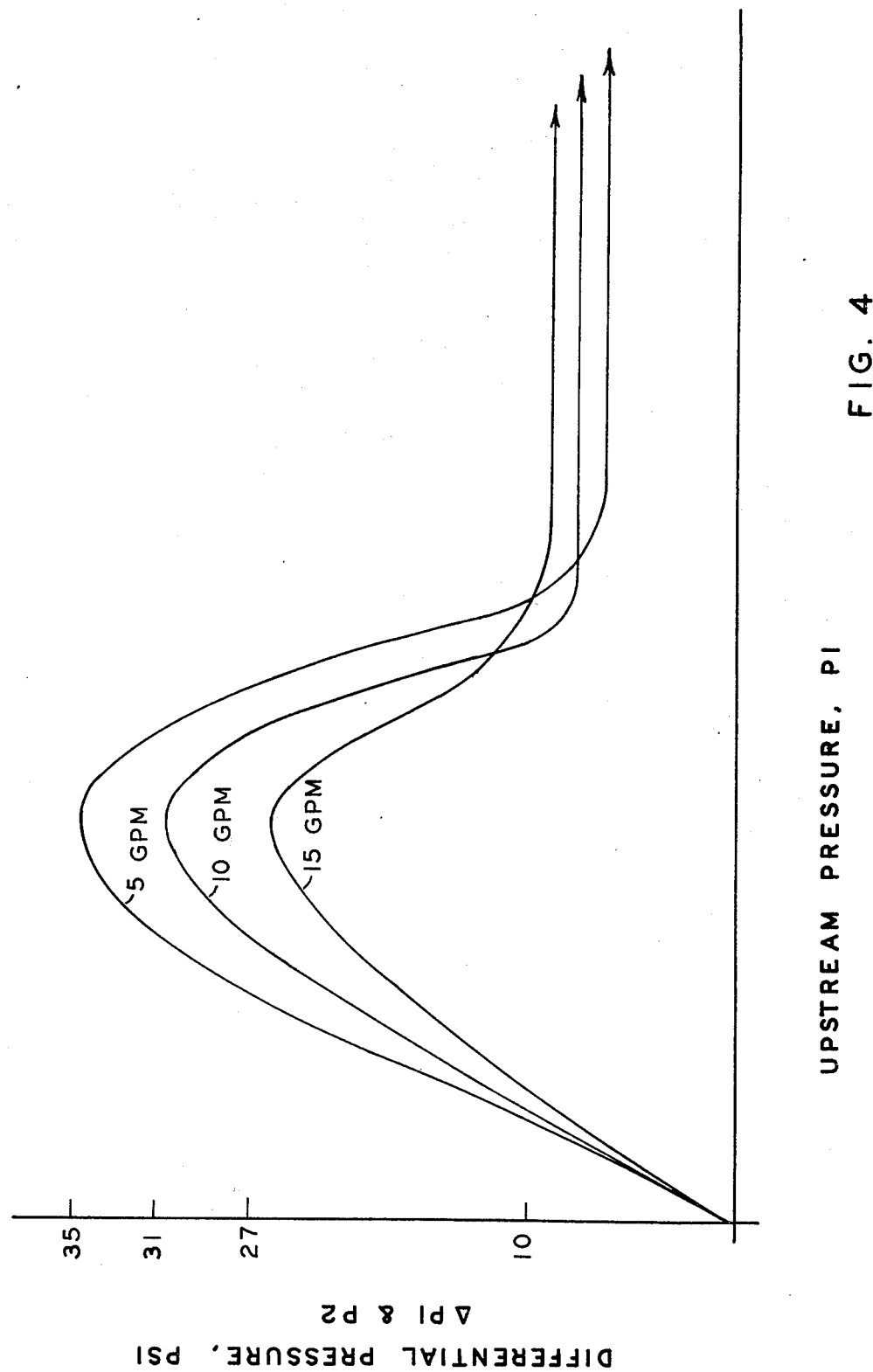

FIG. 4 shows a graph which demonstrates the relationship between the upstream pressure and differential pressure in a no-bypass filter system according to this invention as the filter gathers contamination.

Having thus described my invention in the detail and particularity as required by the Patent Laws, what is desired protected by Letters Patent is set forth in the following claims.

We claim:

1. In a filter system for a fluid activated system comprising a filter head, canister and filter element, said filter element arranged to divide the canister into an inlet and outlet side, said filter head having an inlet port for directing fluid to the inlet side of said canister and an outlet port for delivering fluid from the outlet side of the said canister, the improvement comprising a means for maintaining the pressure drop across the filter element constant comprising a piston cylinder having an open and closed end, a hollow cylindrical piston positioned in said piston cylinder having a closed end disposed generally at the open end of the cylinder and an open end disposed generally at the closed end of the cylinder, means for biasing the closed end of the hollow piston away from the closed end of the cylinder, openings being provided in the sidewall of the cylinder and the hollow piston for permitting flow into the piston and cylinder and openings being provided in the sidewall of the piston near the closed end for permitting flow out of the cylinder, said piston and cylinder arranged such that the outside of the closed end of the piston cylinder is in communication with the inlet port and the piston and cylinder form part of the flow path between the outlet side of the filter element and the outlet port such that as the filter collects contaminants the pressure at the inlet port increases and the pressure drop across the filter element also increases until the cylindrical piston moves within the piston cylinder to restrict the flow of fluid from the outlet side of the filter element to the outlet port, thus preventing further pressure drop across the filter element.

2. In a filter system according to claim 1 in which the inlet and outlet ports are aligned and the cylinder is arranged therebetween with its axis aligned with the axis of the ports.

3. In a filter system according to claim 1, the cylinder having its axis aligned with the inlet port.

4. In a filter system according to claim 1, wherein the inlet and outlet openings of the cylinder and the hollow cylindrical piston are circular.

* * * * *